United States Patent
Woltering et al.

(10) Patent No.: US 7,153,900 B2
(45) Date of Patent: Dec. 26, 2006

(54) STRUCTURALLY VISCOSE CLEAR LACQUER SLURRY

(75) Inventors: Joachim Woltering, Münster (DE); Michael Tecklenborg, Drensteinfurt (DE); Günther Ott, Münster (DE)

(73) Assignee: BASF Coatings AG, Munster (DE)

( * ) Notice: Subject to any disclaimer, the term of this patent is extended or adjusted under 35 U.S.C. 154(b) by 159 days.

(21) Appl. No.: 10/479,727

(22) PCT Filed: Jul. 23, 2002

(86) PCT No.: PCT/EP02/08168

§ 371 (c)(1),
(2), (4) Date: Mar. 2, 2004

(87) PCT Pub. No.: WO03/010115

PCT Pub. Date: Feb. 6, 2003

(65) Prior Publication Data

US 2004/0242742 A1    Dec. 2, 2004

(30) Foreign Application Priority Data

Jul. 24, 2001   (DE)   ................ 101 35 997

(51) Int. Cl.
    *C08K 3/28*     (2006.01)
(52) U.S. Cl. .............. 524/284; 524/556; 524/507
(58) Field of Classification Search ........... 524/284, 524/556, 507
    See application file for complete search history.

(56) References Cited

U.S. PATENT DOCUMENTS

| | | | |
|---|---|---|---|
| 4,006,030 A | 2/1977 | Yoshida et al. ........... 106/74 |
| 4,049,869 A | 9/1977 | De Long ................ 428/413 |
| 4,056,653 A | 11/1977 | Gebhard et al. | |
| 4,539,363 A * | 9/1985 | Backhouse .............. 524/460 |
| 5,047,439 A * | 9/1991 | Sano et al. .............. 521/78 |
| 5,063,095 A * | 11/1991 | Kitagawa et al. ........ 428/35.8 |
| 5,928,577 A | 7/1999 | Kodokian ............... 264/15 |
| 5,965,213 A | 10/1999 | Sacharski et al. | |
| 5,981,653 A | 11/1999 | Wimes et al. ........... 524/839 |
| 5,990,224 A * | 11/1999 | Raynolds et al. ........ 524/501 |
| 6,177,487 B1 | 1/2001 | Sapper et al. .......... 523/333 |
| 6,184,270 B1 | 2/2001 | Beckmann et al. ....... 523/309 |
| 6,204,310 B1 | 3/2001 | Choudhery ............. 523/348 |
| 6,251,985 B1 | 6/2001 | Wamprecht et al. ...... 524/539 |
| 6,485,793 B1 | 11/2002 | Ott et al. ............... 427/508 |
| 6,624,238 B1 | 9/2003 | Ott et al. ............... 524/591 |
| 2002/0123561 A1 | 9/2002 | Rose et al. ............. 524/588 |
| 2003/0022985 A1 | 1/2003 | Rockrath et al. | |
| 2003/0100667 A1 | 5/2003 | Bendix et al. .......... 524/558 |
| 2004/0157982 A1 * | 8/2004 | Raka et al. ............. 524/556 |

FOREIGN PATENT DOCUMENTS

| | | |
|---|---|---|
| CH | 636 328 | 3/1983 |
| DE | 19908018 | 8/2000 |
| DE | 19959923 | 6/2001 |
| DE | 10018581 | 2/2002 |
| DE | 10055464 | 5/2002 |
| EP | 1186640 | 8/2001 |
| FR | 2399988 | 9/1977 |
| WO | WO03/010247 | 2/2003 |
| WO | WO03/010251 | 2/2003 |

OTHER PUBLICATIONS

Copending U.S. Appl. No. 10/479,918.*
English Abstract for CH636328 from EPO, May 31, 1983.
U.S. Appl. No. 09/889,918, filed Jul. 20, 2001, Ott et al.
U.S. Appl. No. 10/148,428, filed May 29, 2002, Bendix et al.
U.S. Appl. No. 10/257,075, filed Oct. 8, 2002, Lassmann et al.
U.S. Appl. No. 10/363,176, filed Mar. 6, 2003, Woltering et al.

* cited by examiner

*Primary Examiner*—Ling-Sui Choi
*Assistant Examiner*—Satya B. Sastri

(57) ABSTRACT

A pseudoplastic clearcoat slurry comprising solid and/or highly viscous particles which are dimensionally stable under storage and application conditions and at least one water soluble salt, preferably from 0.1 to 50 mmol per 1 000 g of water, which can be decomposed without residue or virtually without residue; process for preparing it, and its use.

19 Claims, No Drawings

STRUCTURALLY VISCOSE CLEAR LACQUER SLURRY

CROSS REFERENCE TO RELATED APPLICATIONS

This application is a National Phase Application of Patent Application PCT/EP02/08168 filed on 23 Jul. 2002, which claims priority to DE 101 35 997.7, filed on 24 Jul. 2001.

The present invention relates to a novel pseudoplastic clearcoat slurry. The present invention also relates to a novel process for preparing pseudoplastic clearcoat slurries. The present invention additionally relates to the use of the novel pseudoplastic clearcoat slurry for automotive OEM finishing, automotive refinish, the interior and exterior painting of buildings, the coating of doors, windows and furniture, and industrial coating, including coil coating, container coating, the coating of small parts, the impregnation and/or coating of electrical components, and the coating of white goods. The present invention relates not least to the use of the novel clearcoat slurries as adhesives and sealing compounds for producing adhesive films and seals, especially in the aforementioned fields.

Thermally curable clearcoat slurries which are produced by means of grinding and dispersing techniques are known, for example, from the German patent application DE 195 40 977 A1. Similarly, clearcoat slurries curable with actinic radiation, which are produced by means of grinding and dispersing techniques, are known from the German patent application DE 198 35 206 A1.

Here and below, actinic radiation means electromagnetic radiation, such as near infrared (NIR), visible light, UV radiation or x-rays, especially UV radiation, and corpuscular radiation, such as electron beams.

Thermally curable clearcoat slurries which are produced by means of secondary dispersion techniques are known, for example, from the German patent DE 198 41 842 C2, from the German patent application no. DE 196 17 086 A1 or from the European patent application EP 0 899 282 A1, or are described in the German patent application DE 100 55 464.4, which was unpublished at the priority date of the present specification.

For example, the clearcoat slurries known from the German patent DE 198 41 842 C2 are free from organic solvents and external emulsifiers and contain solid spherical particles with an average size of from 0.8 to 20 μm and a maximum size of 30 μm, and have an ion-forming group content of from 0.05 to 1 meq/g and a neutralizing agent content of from 0.05 to 1 meq/g.

The particles of the clearcoat slurry described in the German patent application DE 100 55 464.4, said application being unpublished at the priority date of the present specification, have an average size of from 1.0 to 20 μm, at least 99% of the particles having a size ≦30 μm. They contain as binder at least one polyol having an OH number >110 mg KOH/g, which has potentially ionic groups. The clearcoat slurry contains an overall amount of potentially ionic groups of from 0.05 to 1 meq/g solids and, at a degree of neutralization of not more than 50%, contains an amount of ionic groups produced by neutralizing the potentially ionic groups which is from 0.005 to 0.1 meq/g solids.

These known pseudoplastic clearcoat slurries have a viscosity of
(i) from 50 to 1 000 mPas at a shear rate of 1 000 $s^{-1}$,
(ii) from 150 to 8 000 mPas at a shear rate of 10 $s^{-1}$, and
(iii) from 180 to 12 000 mPas at a shear rate of 1 $s^{-1}$.

In the secondary dispersion technique, the clearcoat slurries are prepared by
1) emulsifying an organic solution comprising binder and crosslinking agent in water or an aqueous phase, to give an emulsion of the oil-in-water type,
2) removing the organic solvent or the organic solvents, and
3) replacing by water some or all of the solvent removed, to give a clearcoat slurry comprising solid spherical particles, where
4) additionally, at least one ionic, especially anionic, thickener and at least one nonionic associative thickener are added to the clearcoat slurries.

The German patent application DE 199 08 018 A1 discloses clearcoat slurries curable thermally and with actinic radiation—dual-cure clearcoat slurries—which are prepared by the secondary dispersion technique.

The German patent application DE 199 59 923 A1 discloses clearcoat slurries prepared by a primary dispersion technique. With this technique, the powder clearcoat particles are prepared directly in a micro-emulsion or a miniemulsion by means of controlled free-radical copolymerization of olefinically unsaturated monomers.

The international patent applications WO 97/45476, WO 98/45356 or WO 00/17256, the American patent U.S. Pat. No. 4,056,653 A or the German patent applications DE 100 06 673.9 or DE 100 18 581.9, said applications being unpublished at the priority date of the present specification, describe clearcoat slurries curable thermally or both thermally and with actinic radiation and which are prepared with the aid of melt emulsification techniques.

The known clearcoat slurries have very good performance properties and are especially suitable for the production of clearcoats for high-grade multicoat color and/or effect paint systems, as are used, for example, to coat automobiles. In the course of the production of these multicoat color and/or effect paint systems by the wet-on-wet technique, the clearcoat slurries may be used in combination with any of a very wide variety of aqueous base coat materials, without any deleterious effects as a result, such as mud cracking.

The known clearcoat slurries do, however, have the disadvantage that they sometimes give clearcoats having microdefects. These microdefects are manifested in particular on black basecoats as optical effects which are reminiscent of metallic effects. These optical effects are also referred to as "starry sky".

It is an object of the present invention to provide a novel clearcoat slurry which no longer has the disadvantages of the prior art but which instead retains all of the advantages of the known clearcoat slurries while giving clearcoats which no longer have any microdefects, in particular no disruptive optical effects, such as "starry sky".

The invention accordingly provides the novel pseudoplastic clearcoat slurry comprising solid and/or highly viscous particles which are dimensionally stable under storage and application conditions and at least one water-soluble salt which can be decomposed without residue or substantially without residue.

In the text below, the novel pseudoplastic clearcoat slurry is referred to as the "slurry of the invention".

Further subject matter of the invention will emerge from the description.

In the light of the prior art it was surprising for the skilled worker and unforeseeable that the object on which the present invention is based could be achieved by adding at least one specially selected salt to the continuous phase, i.e., the aqueous phase, of the slurry of the invention. A particular surprise was that the improvement aimed at in accordance with the invention was achieved specifically through the use of salts, since salts are generally regarded by those in the coatings art as being destabilizing. Yet more surprising was that the salts for use in accordance with the invention brought forth the improvement aimed at in accordance with the invention across a range of different clearcoat slurries.

The slurries of the invention may be of various compositions. For example, the clearcoat slurries known from the German patent applications DE 195 40 977 A1 or DE 19832 2 06 A1, prepared by means of grinding and dispersing processes and curable thermally or with actinic radiation, the clearcoat slurries known from the German patent application DE 199 59 923 A1, prepared by means of primary dispersion processes and curable thermally or both thermally and with actinic radiation, the clearcoat slurries known from the international patent applications WO 97/45476, WO 98/45356 or WO 00/17256 or from the American patent U.S. Pat. No. 4,056,653 A, or described in the German patent applications DE 100 06 673.9 or DE 100 18 581.9, both unpublished at the priority date of the present specification, prepared by means of melt emulsification processes and curable thermally or both thermally and with actinic radiation, or the clearcoat slurries known from the German patent applications DE 198 41 842 A1, DE 196 17 086 A1 or DE 199 08 018 A1 or from the European patent application EP 0 899 282 A1, or described in the German patent application DE 100 55 464.4, unpublished at the priority date of the present specification, prepared by means of secondary dispersion processes and curable thermally or both thermally and with actinic radiation are a suitable basis for the slurries of the invention.

Of these, the clearcoat slurries known from the German patent applications DE 198 41 842 A1 or DE 199 08 018 A1 or described in the German patent application DE 100 55 464.4, unpublished at the priority date of the present specification, prepared by means of secondary dispersion processes and curable thermally or both thermally and with actinic radiation, which are free or substantially free from external emulsifiers and organic solvents, are of advantage and are therefore used with preference in accordance with the invention. Of these, the clearcoat slurries described in the German patent application DE 100 55 464.4, unpublished at the priority date of the present specification, display particular advantages and are therefore used with particular preference in accordance with the invention.

Very particular preference is given to the clearcoat slurries prepared by the secondary dispersion process and comprising the specific methacrylate copolymers described below as binders in the dimensionally stable particles.

The slurry of the invention comprises as a constituent essential to the invention at least one, especially one, water-soluble salt, preferably in an amount of from 0.1 to 50 mmol per 1 000 g of water present in the slurry of the invention. It is preferred to use from 0.2 to 40, with particular preference from 0.3 to 30, with very particular preference from 0.4 to 20, in particular from 0.5 to 10, and especially from 0.5 to 8 mmol/1 000 g of water.

The salt can be decomposed without residue or substantially without residue. This means that in the course of its decomposition it does not form any residues or forms residues only in an amount that does not induce deleterious technical effects in the clearcoats of the invention.

The salt may be decomposable by means of heat and/or actinic radiation. Preferably, it is thermally decomposable. It is preferably decomposable under the conditions of the curing of the clearcoat films of the invention produced from the slurries of the invention. It is of advantage in accordance with the invention if the salt is decomposable at temperatures above 100° C. The decomposition of the salt is preferably at an end at 250° C., more preferably 200° C., with particular preference 190° C., and in particular 180° C.

The decomposition of the salt may be accompanied by formation of any of a very wide variety of organic, inorganic and organometallic decomposition products. The decomposition products, accordingly, may comprise volatile elements, neutral organic or inorganic hydrogen compounds, organic and inorganic bases, organic and inorganic acids or oxides.

Examples of volatile elements are phosphorus, sulfur, nitrogen and oxygen, especially nitrogen.

Examples of neutral organic and inorganic hydrogen compounds are water and hydrocarbons, especially water.

Examples of organic and inorganic bases are ammonia, methylamine, dimethylamine and trimethylamine, especially ammonia.

Examples of organic and inorganic acids are formic acid, acetic acid, propionic acid, oxalic acid, citric acid, tartaric acid, hydrochloric acid, hydrogen bromide, phosphoric acid, phosphorous acid, amidosulfonic acid, sulfuric acid, sulfurous acid, thiosulfuric acid, HSCN and hydrogen sulfide, especially acetic acid.

Examples of oxides are carbon dioxide, sulfur dioxide, sulfur trioxide and phosphorus oxide, especially carbon dioxide.

It is preferred to select a salt whose decomposition products are of little or no toxicity and/or of little or no corrosiveness. Preference is given to selecting a salt which forms, as its decomposition products, water, nitrogen, carbon dioxide, ammonia and organic acids.

With particular preference, the salt is selected from the group of ammonium salts, with very particular preference from the group consisting of salts of ammonia and of organic amines with organic and inorganic acids.

The ammonium salt is selected in particular from the group consisting of ammonium carbonate, ammonium thiocyanate, ammonium sulfamate, ammonium sulfite monohydrate, ammonium formate, ammonium acetate, ammonium hydrogen oxalate monohydrate, diammonium oxalate monohydrate, ammonium citrate, and ammonium tartrate. Of these, in turn, ammonium carbonate and ammonium acetate are very particularly advantageous and are therefore used with very particular preference in accordance with the invention.

The slurry of the invention comprises dimensionally stable particles. In the context of the present invention, "dimensionally stable" means that, under the customary known conditions of storage and application of clearcoat slurries, the particles undergo little if any agglomeration and/or breakdown into smaller particles, but instead substantially retain their original form even under the influence of shear forces. The particles may be highly viscous and/or solid. Preferably, the dimensionally stable particles are solid.

For the slurry of the invention it is advantageous if the average size of the particles is from 1 to 20 μm and with particular preference from 3 to 15 μm. By average particle size is meant the 50% median value as determined by the laser diffraction method, i.e., 50% of the particles have a diameter ≦ the median value and 50% of the particles have a diameter ≧ the median value. Preferably, at least 99% of the particles have a size <30 μm.

Slurries having average particle sizes of this kind and a solvent content of <1% exhibit better application properties and, at the applied film thicknesses of >30 μm as presently practiced in the automobile industry for the finishing of automobiles, exhibit much less of a tendency toward popping marks and mudcracking than conventional clearcoat slurries.

The upper limit on particle size is reached when the size of the particles means that they are no longer able to flow out fully on baking, and thus film leveling is adversely affected. In cases where requirements regarding the appearance are not very stringent, however, the limit may also be higher. 30 μm is considered a sensible upper limit, since above this particle size the spray nozzles and the rinsing ducts of the highly sensitive application apparatus are likely to become blocked.

The slurry of the invention is, preferably, substantially or entirely free from organic solvents. In the context of the present invention this means that it has a residual volatile solvent content of preferably <3% by weight, particularly preferably <2% by weight, and with very particular preference <1% by weight.

Preferably, the slurry of the invention is substantially or entirely free, in the above-mentioned context, from external emulsifiers (regarding "emulsifiers" cf. Johan Bieleman, "Lackadditive" [additives for coatings], pages 160 to 100, "interface-active compounds"). Excluded from this proviso are the alkoxylated $C_{16}$–$C_{18}$ fatty alcohols which are preferably added to the slurries of the invention in the course of their preparation by the secondary dispersion technique, by way of the organic solution of the constituents or by way of the aqueous phase.

The preferred particle size as described above may also be obtained without the aid of additional external emulsifiers if the slurry of the invention contains from 0.05 to 1, preferably from 0.05 to 0.9, more preferably from 0.05 to 0.8, with particular preference from 0.05 to 0.7, and in particular from 0.05 to 0.6 meq of potentially ionic groups per g of solids. The amount of neutralizing agents is preferably chosen such that the degree of neutralization is 100%, preferably below 80%, with particular preference below 60%, and in particular below 50%.

The chemical nature of the binder is generally not restricting in this respect, provided it contains ion-forming groups which can be converted into salt groups by neutralization and which, as a result, are able to take over the function of ionic stabilization of the particles in water.

Suitable anion-forming groups include acid groups such as carboxylic acid, sulfonic acid or phosphonic acid groups, especially carboxylic acid groups. Accordingly, bases, such as alkali metal hydroxides, ammonia or amines, are used as neutralizing agents. Alkali metal hydroxides can be used only to a limited extent, since the alkali metal ions are not volatile on baking and, owing to their incompatibility with organic substances, may cause the film to become cloudy and may lead to loss of gloss. Therefore, ammonia or amines are preferred. In the case of amines, tertiary amines are preferred. By way of example, mention may be made of N,N-dimethylethanolamine or aminomethylpropanolamine (AMP).

Suitable cation-forming groups include primary, secondary and tertiary amines. Accordingly, neutralizing agents used are, in particular, low molecular mass organic acids such as formic acid, acetic acid, dimethylolpropionic acid or lactic acid.

For the preferred use of the slurry of the invention in automobile finishing as an unpigmented clearcoat material, preference is given to polymers or oligomers containing acid groups as ion-forming groups, since these so-called anionic binders generally exhibit better resistance to yellowing than the class of the cationic binders.

However, cationic binders containing groups which can be converted into cations, such as amino groups, are likewise suitable for use in principle, provided the field of use tolerates their typical secondary properties such as their tendency toward yellowing.

Examples of suitable binders are random, alternating and/or block, linear and/or branched and/or comb, addition (co)polymers of ethylenically unsaturated monomers, or polyaddition resins and/or poly-condensation resins. For further details of these terms, refer to Römpp Lexikon Lacke und Druckfarben, Georg Thieme Verlag, Stuttgart, N.Y., 1998, page 457, "polyaddition" and "polyaddition resins (poly-adducts)", and also pages 463 and 464, "polycondensates", "polycondensation" and "polycondensation resins", and also pages 73 and 74, "binders".

Examples of suitable addition (co)polymers are (meth) acrylate (co)polymers or partially saponified polyvinyl esters, especially (meth)acrylate copolymers.

Examples of suitable polyaddition resins and/or polycondensation resins are polyesters, alkyds, polyurethanes, polylactones, polycarbonates, polyethers, epoxy resins, epoxy resin-amine adducts, polyureas, polyamides, polyimides, polyester-polyurethanes, polyether-polyurethanes or polyester-polyether-polyurethanes.

These oligomers and polymers are known to the skilled worker, and many suitable compounds are available on the market.

In accordance with the invention the (meth)acrylate copolymers, the polyesters, the alkyd resins, the polyurethanes and/or the acrylated polyurethanes are of advantage and are therefore used with preference.

Highly suitable (meth)acrylate copolymers and processes for preparing them are described, for example, in the German patent application DE 199 08 018 A1, page 9, line 44, to page 10, line 53, in the European patent application EP 0 767 185 A1, in the German patents DE 22 14 650 B1 and DE 27 49 576 B1, and in the American patents U.S. Pat. No. 4,091,048 A, U.S. Pat. No. 3,781,379 A, U.S. Pat. No. 5,480,493 A, U.S. Pat. No. 5,475,073 A, and U.S. Pat. No. 5,534,598 A, or in the standard work by Houben-Weyl, Methoden der organischen Chemie, 4th edition, volume 14/1, pages 24 to 255, 1961. Suitable reactors for the copolymerization include the customary and known stirred tanks, stirred tank cascades, tube reactors, loop reactors or Taylor reactors, as are described, for example, in the patent applications DE 1 071 241 B1, EP 0 498 583 A1 or DE 198 28 742 A1 or in the article by K. Kataoka in Chemical Engineering Science, volume 50, No. 9, 1995, pages 1409 to 1416.

Highly suitable polyesters and alkyd resins, and their preparation, are described, for example, in the standard work Ullmans Encyklopädie der technischen Chemie, 3rd edition, volume 14, Urban & Schwarzenberg, Munich, Berlin, 1963, pages 80 to 89 and pages 99 to 105, and also in the following books: "Résines Alkydes-Polyesters" by J. Bourry, Dunod, Paris, 1952, "Alkyd Resins" by C. R. Martens, Reinhold Publishing Corporation, New York, 1961, and, "Alkyd Resin Technology" by T. C. Patton, Interscience Publishers, 1962.

Highly suitable polyurethanes and/or acrylated polyurethanes and their preparation are described, for example, in the patents EP 0 708 788 A1, DE 44 01 544 A1 or DE 195 34 361 A1.

Very particular advantages result for the slurries of the invention if their dimensionally stable particles comprise as binder(s) at least one methacrylate copolymer which contains in copolymerized form, based on a given methacrylate copolymer, at least 90% by weight, preferably at least 95% by weight, and in particular at least 99% by weight of methacrylate comonomers, including methacrylate comonomers containing potentially ionic groups.

Preferably, the (meth)acrylate comonomers containing potentially ionic groups comprise acrylic acid, beta-carboxyethyl acrylate and/or methacrylic acid, especially methacrylic acid. The (meth)acrylate comonomers containing potentially ionic groups are preferably copolymerized into the methacrylate copolymers in an amount such that the above-described amount of potentially ionic groups in the particles can be set without problems. They are copolymerized into the methacrylate copolymers preferably in an amount of from 0.1 to 3%, more preferably from 0.2 to 2.8%, with particular preference from 0.3 to 2.6%, with very particular preference from 0.4 to 2.4%, and in particular from 0.5 to 2.2% by weight, based in each case on a given methacrylate copolymer.

The methacrylate copolymers preferably have a glass transition temperature, Tg, of not more than 50° C.; at the same time the glass transition temperature Tg should not go below preferably 0° C., more preferably 10° C., and in particular 20° C.

The glass transition temperature, Tg, of the methacrylate copolymers is preferably set by way of at least one methacrylate comonomer which is free from reactive functional groups and from potentially ionic groups. More preferably, the glass transition temperature, Tg, is set by way of at least two, in particular two, methacrylate comonomers which are free from reactive functional groups and from potentially ionic groups. Preferably, the glass transition temperatures, Tg, of the respective homopolymers of the methacrylate comonomers that are free from reactive functional groups and from potentially ionic groups differ from one another by not more than 40° C.

Examples of suitable methacrylate comonomers free from reactive functional groups and from potentially ionic groups are methyl, ethyl, n-propyl, n-butyl, i-butyl, tert-butyl, n-pentyl, isoamyl, cyclopentyl, n-hexyl and cyclohexyl methacrylate. Of these, i-butyl methacrylate (glass transition temperature, Tg, of the homopolymer: 53° C.) and n-butyl methacrylate (glass transition temperature, Tg, of the homopolymer: 20° C.) are of advantage and are therefore used with particular preference.

The amount of the copolymerized methacrylate comonomers, free from reactive functional groups and from potentially ionic groups, that is copolymerized into the methacrylate copolymers to be used with preference may vary widely. It is essential that the amount is chosen such that the resulting methacrylate copolymers have the glass transition temperature, Tg, described above. The amount is preferably at least 50%, more preferably at least 55%, with particular preference at least 60%, with very particular preference at least 65%, and in particular at least 70% by weight, based in each case on a given methacrylate copolymer.

The weight ratio of the methacrylate comonomers used with particular preference, n-butyl methacrylate and i-butyl methacrylate, may vary widely. The n:i weight ratio is preferably from 10:1 to 1:6, more preferably from 8:1 to 1:4, with particular preference from 6:1 to 1:2, with very particular preference from 5:1 to 1:1.5, and in particular from 4:1 to 1:1.

Where the slurries of the invention are physically curable slurries, the methacrylate copolymers contain reactive functional groups, if at all, only in a number which is insubstantial as far as crosslinking is concerned.

Where the slurries of the invention are thermally self-crosslinking, the methacrylate copolymers contain the complementary reactive functional groups for thermal crosslinking, described below, and/or reactive functional groups which are able to crosslink "with themselves", i.e., with groups of their own kind.

Where the slurries of the invention are curable with actinic radiation, the methacrylate copolymers may contain reactive functional groups having at least one bond which can be activated with actinic radiation. These reactive functional groups are mandatorily present in the methacrylate copolymers of the slurries of the invention that are curable with actinic radiation if the slurries contain no other radiation-curable constituents.

Where the slurries of the invention are dual-cure slurries, the methacrylate copolymers contain reactive functional groups for thermal crosslinking and/or reactive functional groups containing at least one bond which can be activated with actinic radiation. The reactive functional groups containing at least one bond which can be activated with actinic radiation are mandatorily present in the methacrylate copolymers of the dual-cure slurries of the invention if the dual-cure slurries contain no other radiation-curable constituents.

Examples of suitable complementary reactive functional groups for use in accordance with the invention are placed together in the following overview. In the overview, the variable R stands for an acyclic or cyclic aliphatic radical, an aromatic radical and/or an aromatic-aliphatic (araliphatic) radical; the variables R' and R" stand for identical or different aliphatic radicals or are linked with one another to form an aliphatic or heteroaliphatic ring.

Overview: Examples of Complementary Reactive Functional Groups

| Binder and crosslinking agent or Crosslinking agent and binder | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR |
| —O—(CO)—NH$_2$ | —CH$_2$—OH |
| >NH | —CH$_2$—O—R |
| | —NH—CH$_2$—O—R |
| | —NH—CH$_2$—OH |
| | —N(—CH$_2$—O—R)$_2$ |
| | —NH—C(O)—CH(—C(O)OR)$_2$ |
| | —NH—C(O)—CH(—C(O)OR)(—C(O)—R) |
| | —NH—C(O)—NR'R" |
| | >Si(OR)$_2$ |

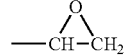

—C(O)—OH

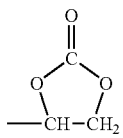

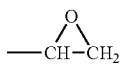

—C(O)—N(CH$_2$—CH$_2$—OH)$_2$

The selection of the respective complementary reactive functional groups is guided on the one hand by the consideration that they should not enter into any unwanted reactions during the preparation of the binders and during the preparation, storage, application, and melting of the slurries of the invention, and in particular should not form any polyelectrolyte complexes or undergo premature cross-linking, and/or must not disrupt or inhibit curing with actinic radiation, and secondly by the temperature range within which crosslinking is to take place.

For the slurries of the invention it is preferred to employ crosslinking temperatures of from 60 to 180° C. Use is therefore made preferably of binders containing thio, hydroxyl, N-methylolamino, N-alkoxymethylamino, imino, carbamate, and/or allophanate groups, preferably hydroxyl groups, on the one hand and, preferably, crosslinking agents containing anhydride, epoxy, blocked and unblocked, especially blocked, isocyanate, urethane, methylol, methylol ether, siloxane, carbonate, amino, hydroxyl and/or beta-hydroxyalkylamide groups, preferably blocked isocyanate, carbamate and/or N-alkoxymethylamino groups, on the other.

In the case of self-crosslinking slurries of the invention, the binders (A) contain, in particular, methylol, methylol ether and/or N-alkoxymethylamino groups.

Complementary reactive functional groups which are especially suitable for use in the thermally externally crosslinking slurries of the invention and the dual-cure slurries of the invention are hydroxyl groups on the one hand and blocked isocyanate groups on the other.

The functionality of the binders in respect of the reactive functional groups described above may vary very widely and is guided in particular by the desired crosslinking density and/or by the functionality of the crosslinking agents that are employed in each case. In the case of hydroxyl-containing binders, for example, the OH number is preferably from 20 to 300, more preferably from 40 to 250, with particular preference from 60 to 200, with very particular preference from 80 to 190, and in particular from 90 to 180 mg KOH/g.

The above-described complementary reactive functional groups may be incorporated into the binders in accordance with the customary and known methods of polymer chemistry. This can be done, for example, through the incorporation of methacrylate comonomers which carry the corresponding reactive functional groups, and/or with the aid of polymer-analogous reactions.

Examples of suitable methacrylate comonomers containing reactive functional groups are methacrylate comonomers which carry at least one hydroxyl, amino, alkoxymethylamino, carbamate, allophanate or imino group per molecule, such as hydroxyalkyl esters of methacrylic acid, which are derived from an alkylene glycol which is esterified with the acid, or which are obtainable by reaction of the methacrylic acid with an alkylene oxide such as ethylene oxide or propylene oxide, especially hydroxyalkyl esters of methacrylic acid in which the hydroxyalkyl group contains up to 20 carbon atoms, such as 2-hydroxyethyl, 2-hydroxypropyl, 3-hydroxypropyl, 3-hydroxybutyl or 4-hydroxybutyl methacrylate; or hydroxycycloalkyl esters such as 1,4-bis(hydroxymethyl)cyclohexane, octahydro-4,7-methano-1H-indenedimethanol or methylpropanediol monomethacrylate; or reaction products of cyclic esters, such as epsilon-caprolactone, and these hydroxyalkyl methacrylates;

reaction products of methacrylic acid of the glycidyl ester of an alpha-branched monocarboxylic acid having from 5 to 18 carbon atoms per molecule, particularly a Versatic® acid, or instead of the reaction product an equivalent amount of methacrylic acid, which is then reacted, during or after the polymerization reaction, with the glycidyl ester of an alpha-branched monocarboxylic acid having from 5 to 18 carbon atoms per molecule, particularly a Versatic® acid;

aminoethyl methacrylate or N-methylaminoethyl methacrylate, which may also be used to introduce potentially ionic groups;

N,N-di(methoxymethyl)aminoethyl methacrylate or N,N-di(butoxymethyl)aminopropyl methacrylate;

methacrylamides such as methacrylamide, N-methyl-, N-methylol-, N,N-dimethylol-, N-methoxymethyl-, N,N-di(methoxymethyl)-, N-ethoxymethyl- and/or N,N-di(ethoxyethyl)-methacrylamide;

methacryloyloxyethyl, -propyl or -butyl carbamate or allophanate; further examples of suitable methacrylate comonomers containing carbamate groups are described in the patents U.S. Pat. No. 3,479,328 A, U.S. Pat. No. 3,674,838 A, U.S. Pat. No. 4,126,747 A, U.S. Pat. No. 4,279,833 A or U.S. Pat. No. 4,340,497 A.

In minor amounts, the reactive functional groups for thermal crosslinking may be introduced by way of other olefinically unsaturated monomers, such as the corresponding acrylates, allylamine, allyl alcohol or polyols, such as trimethylolpropane monoallyl or diallyl ether or pentaerythritol monoallyl, diallyl or triallyl ether.

The binders of the dual-cure slurries of the invention or those of the slurries of the invention which are curable purely with actinic radiation may contain on average per molecule at least one, preferably at least two, group(s) containing at least one bond which can be activated with actinic radiation.

In the context of the present invention, a bond which can be activated with actinic radiation means a bond which, on exposure to actinic radiation, becomes reactive and, together with other activated bonds of its kind, enters into polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the group that is preferred in accordance with the invention contains one double bond or two, three or four double bonds. Where more than one double bond is used, the double bonds may be conjugated. In accordance with the invention, however, it is of advantage if the double bonds are present in isolation, in particular each terminally, within the group in question. It is of particular advantage in accordance with the invention to use two double bonds, especially one double bond.

The dual-cure binder contains on average at least one of the above-described groups which can be activated with actinic radiation. This means that the functionality of the binder in this respect is integral, i.e., for example, is two, three, four, five or more, or is nonintegral, i.e., for example, is from 2.1 to 10.5 or more. The decision as to which functionality is chosen is guided by the requirements which are imposed on the respective dual-cure slurries.

Where on average per molecule more than one group which can be activated with actinic radiation is used, the groups are structurally different from one another or of the same structure.

Where they are structurally different from one another, this means in the context of the present invention that two, three, four or more, but especially two, groups which can be activated with actinic radiation are used which derive from two, three, four or more, but especially two, monomer classes.

Examples of suitable groups are (meth)acrylate, ethacrylate, crotonate, cinnamate, vinyl ether, vinyl ester; dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; dicyclopentadienyl ester, norbornenyl ester, isoprenyl ester, isopropenyl ester, allyl ester or butenyl ester groups, but especially acrylate groups.

The groups are attached to the respective parent structures of the binders preferably by way of urethane, urea, allophanate, ester, ether and/or amide groups, but in particular by way of ester groups. This is normally done by means of customary and known continuous polymer-analogous reactions such as, for instance, the reaction of pendant glycidyl groups with olefinically unsaturated comonomers containing an acid group, of pendant hydroxyl groups with the halides of these comonomers, of hydroxyl groups with isocyanates containing double bonds, such as vinyl isocyanate, methacryloyl isocyanate and/or 1-(1-isocyanato-1-methylethyl)-3-(1-methylethenyl)benzene (TMI® from CYTEC), or of pendant isocyanate groups with the hydroxyl-containing comonomers described above.

In the particles it is, however, also possible to employ mixtures of binders that are curable by means of heat alone and of binders that are curable by means of actinic radiation alone.

Processes for preparing the methacrylate copolymers to be used with preference are described in the patent applications, patents and literature references disclosed above. With particular preference, the methacrylate copolymers are prepared under pressure.

The amount of the binders described above in the dimensionally stable particles of the slurry of the invention may vary widely. In the case of the thermally externally crosslinking or of the thermally externally crosslinking and actinic-radiation-curable slurries of the invention said amount is preferably from 5 to 80%, more preferably from 6 to 75%, with particular preference from 7 to 70%, with very particular preference from 8 to 65% and in particular from 9 to 60% by weight, based in each case on the solids of the slurries of the invention. In the case of the slurries of the invention that are curable physically and those that are curable with actinic radiation, but especially those that are curable physically, the amount may be up to 100% by weight.

The dimensionally stable particles of the slurries of the invention that are curable thermally, or thermally and with actinic radiation, may comprise crosslinking agents which contain complementary reactive functional groups for thermal crosslinking and/or reactive functional groups containing at least one bond which can be activated with actinic radiation. Suitable crosslinking agents are all crosslinking agents that are customary in the field of light-stable clearcoats. Examples of suitable crosslinking agents are amino resins, as described for example in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A1 or EP 0 245 700 A1, and in the article by B. Singh and coworkers, "Carbamylmethylated Melamines, Novel Crosslinkers for the Coatings Industry", in Advanced Organic Coatings Science and Technology Series, 1991, volume 13, pages 193 to 207;

carboxyl-containing compounds or resins, as described for example in the patent DE 196 52 813 A1 or 198 41 408 A1, especially 1,12-dodecanedioic acid, resins or compounds containing epoxide groups, as described for example in the patents EP 0 299 420 A1, DE 22 14 650 B1, DE 27 49 576 B1, U.S. Pat. No. 4,091,048 A or U.S. Pat. No. 3,781,379 A; tris(alkoxycarbonylamino)triazines, as described in the patents U.S. Pat. No. 4,939,213 A, U.S. Pat. No. 5,084,541 A, U.S. Pat. No. 5,288,865 A or in the patent application EP 0 604 922 A;

blocked polyisocyanates, as described for example in the patents U.S. Pat. No. 4,444,954 A1, DE 196 17 086 A1, DE 196 31 269 A1, EP 0 004 571 A1 or EP 0 582 051 A1; or beta-hydroxyalkylamides such as N,N,N',N'-tetrakis(2-hydroxyethyl)adipamide or N,N,N',N'-tetrakis(2-hydroxypropyl)adipamide.

The crosslinking agents described above may be used individually or as a mixture of at least two crosslinking agents. In accordance with the invention, the blocked polyisocyanates and/or tris(alkoxycarbonylamino)triazines, especially the blocked polyisocyanates, afford particular advantages and are therefore used with particular preference.

The amount of crosslinking agent(s) in the dimensionally stable particles may likewise vary widely and is guided primarily by the functionality and amount of the binders on the one hand and by the functionality of the crosslinking agents on the other. The amount is preferably from 10 to 95%, more preferably from 12 to 94%, with particular preference from 14 to 93%, with very particular preference from 16 to 92%, and in particular from 18 to 90% by weight, based in each case on the solids of the slurry of the invention.

In addition to the essential constituents described above, the dimensionally stable particles of the slurry of the invention may comprise additives such as are commonly used in clearcoat materials. It is essential that these additives do not substantially lower the glass transition temperature, Tg, of the binders.

Examples of suitable additives are polymers (other than the above-described methacrylate copolymers), crosslinking catalysts, defoamers, adhesion promoters, additives for improving substrate wetting, additives for improving surface smoothness, flatting agents, light stabilizers, corrosion inhibitors, biocides, flame retardants, and polymerization inhibitors, especially photoinhibitors, as described in the book "Lackadditive" by Johan Bieleman, Wiley-VCH, Weinheim, N.Y., 1998.

Moreover, the dimensionally stable particles may also comprise constituents curable with actinic radiation, different than the binders and crosslinking agents described above, as additives if the slurry of the invention is to be curable thermally and with actinic radiation or with actinic radiation alone. Examples of such constituents include the binders envisaged for use in UV-curable clearcoat materials and powder clearcoat materials and described in the European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, the German patent applications DE 197 09 467 A1, DE 42 03 278 A1, DE 33 16 593 A1, DE 38 36 370 A1, DE 24 36 186 A1 or DE 20 03 579 B1, the international patent applications WO 97/46549 or WO 99/14254 or the American patents U.S. Pat. No. 5,824,373 A, U.S. Pat. No. 4,675,234 A, U.S. Pat. No. 4,634,602 A, U.S. Pat. No. 4,424,252 A, U.S. Pat. No. 4,208,313 A, U.S. Pat. No. 4,163,810 A, U.S. Pat. No. 4,129,488 A, U.S. Pat. No. 4,064,161 A or U.S. Pat. No. 3,974,303 A;

reactive diluents curable with actinic radiation, such as those described in Römpp Lexikon Lacke und Druckfarben, Georg Thieme Verlag, Stuttgart, N.Y., 1998, on page 491 under the headword "reactive diluents"; or photoinitiators as described in Römpp Chemie Lexikon, 9th, expanded and revised edition, Georg Thieme Verlag, Stuttgart, vol. 4, 1991, or in Römpp Lexikon Lacke und Druckfarben, Georg Thieme Verlag, Stuttgart, 1998, pages 444 to 446.

The slurry of the invention may likewise comprise additives in the aqueous phase.

Preferably, the additives in question are nonionic and/or ionic thickeners. This effectively counters the tendency of the comparatively large solid particles toward sedimentation.

Examples of nonionic thickeners are hydroxyethylcellulose and polyvinyl alcohols. So-called nonionic associative thickeners are likewise available on the market in a diverse selection. They generally comprise water-dilutable polyurethanes which are reaction products of water-soluble polyetherdiols, aliphatic diisocyanates, and monofunctional hydroxyl compounds with an organophilic radical.

Likewise available commercially are ionic thickeners. These normally contain anionic groups and are based in particular on special polyacrylate resins with acid groups, some or all of which may have been neutralized.

Examples of suitable thickeners for use in accordance with the invention are known from the text book "Lackadditive" by Johan Bieleman, Wiley-VCH, Weinheim, N.Y., 1998, pages 31 to 65, or from the German patent application DE 199 08 018 A1, page 13, line 18 to page 14, line 48.

For the slurry of the invention it may be advantageous if both of the above-described types of thickener are present therein. In by far the majority of cases, however, one thickener is sufficient, particularly a nonionic thickener, to provide the desired pseudo-plasticity.

The amount of thickeners to be added, and, where two different thickeners are employed, the ratio of ionic to nonionic thickener, are guided by the desired viscosity of the slurry of the invention, which in turn is determined by the required sedimentation stability and the specific requirements of spray application. The skilled worker is therefore able to determine the amount of the thickeners and, where appropriate, the ratio of the thickener types to one another on the basis of simple considerations, possibly with the aid of preliminary tests.

The viscosity is preferably set to within a range from 50 to 1 500 mPas at a shear rate of 1 000 $s^{-1}$ and from 150 to 8 000 mPas at a shear rate of 10 $s^{-1}$, and also from 180 to 12 000 mPas at a shear rate of 1 $s^{-1}$.

This viscosity behavior, known as "pseudoplasticity", describes a state which does justice both to the requirements of spray application, on the one hand, and to the requirements in terms of storage and sedimentation stability, on the other: in the state of motion, such as when pumping the slurry of the invention in circulation in the ring circuit of the coating plant and when spraying, for example, the slurry of the invention adopts a state of low viscosity which ensures easy processability. In the absence of shear stress, on the other hand, the viscosity rises and thus ensures that the coating material already present on the substrate to be coated has a reduced tendency to form runs on vertical surfaces. In the same way, a result of the higher viscosity in the stationary state, such as during storage, for instance, is that sedimentation of the solid particles is very largely prevented or that any slight degree of settling of the slurry of the invention during the storage period can be removed again by agitation.

The aqueous phase of the slurry of the invention may further comprise leveling assistants which can be incorporated in the film by crosslinking. Examples of suitable constituents of this kind are thermally curable reactive diluents such as positionally isomeric diethyloctanediols or hydroxyl-containing hyperbranched compounds or dendrimers such as are described in the German patent applications DE 198 05 421 A1, DE 198 09 643 A1 or DE 198 40 405 A1.

Furthermore, the aqueous phase of the slurry of the invention may also comprise alkoxylated, especially ethoxylated, $C_{16}$–$C_{18}$ fatty alcohols containing more than 20 oxalkanediyl groups in the molecule, such as are sold, for example, by BASF Aktiengesellschaft under the brand name Lutensol® AT 50.

The slurry of the invention is preferably prepared by the secondary dispersion processes from the German patent application DE 199 08 018 A1 or from the German patent DE 198 41 842 C2 or described in the German patent application 100 55 464.4, unpublished at the priority date of the present specification.

For this process, the ionically stabilizable binders and the crosslinking agents and also, where appropriate, the additives are mixed in organic solution and emulsified together in water with the aid of neutralizing agents. The dispersion is then diluted with water, while stirring. To start with a water-in-oil emulsion is formed, which on further dilution is transformed into an oil-in-water emulsion. This point is generally reached at solids contents of <50% by weight, based on the emulsion, and is evident externally from a relatively sharp fall in viscosity in the course of the dilution.

The oil-in-water emulsion may also be prepared directly by the melt emulsification of the binders and of the crosslinking agents and also, where appropriate, of the additives in water.

The resulting emulsion, which still contains solvents, is subsequently freed from its solvents by azeotropic distillation.

In accordance with the invention it is of advantage if the solvents to be removed are distilled off at a distillation temperature below 70° C., preferably below 50° C., and in particular below 40° C. If desired, the distillation pressure is chosen so that this temperature range is observed in the case of relatively higher-boiling solvents.

At its most simple, the azeotropic distillation may be effected by stirring the emulsion at room temperature in an open vessel for several days. Preferably, the solvent-containing emulsion is freed from its solvents by vacuum distillation.

In order to avoid high viscosities, the amount of water and solvents removed by evaporation or distillation is replaced by water. The water may be added before, during, or after the evaporation or distillation, by addition in portions.

Following the loss of solvents, the glass transition temperature, Tg, of the dispersed particles rises and a dispersion, i.e. the slurry of the invention, forms instead of the previous solvent-containing emulsion.

The salts for use in accordance with the invention may be introduced into the slurries of the invention, or their precursors, in a variety of ways. For example, the salts may be added to customary and known clearcoat slurries to give the slurries of the invention. They may also be added to the organic solution of constituents of the powder slurry of the invention. Preferably, they are dissolved in the water or the aqueous phase prior to the emulsification of the organic solution.

If desired, the particles of the slurry of the invention are mechanically comminuted in the wet state, a procedure also referred to as wet grinding. In the course of this treatment it is preferred to employ conditions such that the temperature of the material being ground does not exceed 70° C., more preferably 60° C., and in particular 50° C. The specific energy input during the grinding process is preferably from 10 to 1 000, more preferably from 15 to 750, and in particular from 20 to 500 Wh/g.

For wet grinding it is possible to employ a very wide variety of equipment which produces high or low shear fields.

Examples of suitable equipment producing low shear fields are customary and known stirred tanks, slot homogenizers, microfluidizers, and dissolvers.

Examples of suitable equipment producing high shear fields are customary and known stirred mills and inline dissolvers.

Particular preference is given to employing the equipment which produces high shear fields. Of this equipment, the stirred mills are particularly advantageous in accordance with the invention and are therefore used with very particular preference.

During wet grinding, generally, the slurry of the invention is supplied to the above-described equipment, and circulated therein, by means of appropriate devices, such as pumps, until the desired particle size has been reached.

The slurry of the invention advantageously has a solids content of from 10 to 60% by weight, in particular from 20 to 50% by weight.

The slurry of the invention is preferably filtered prior to its use. This is done using the customary and known filtration equipment and filters, such as are also suitable for filtering the known clearcoat slurries. The mesh size of the filters may vary widely and is guided primarily by the size and size distribution of the particles of the slurry of the invention. The skilled worker is therefore easily able to determine the appropriate filters on the basis of this physical parameter. Examples of suitable filters are bag filters. These are available on the market under the brand names Pong® or Cuno®. It is preferred to use bag filters having mesh sizes of from 25 to 50 μm, examples being Pong® 25 to Pong® 50.

To produce the clearcoats of the invention, the slurry of the invention is applied to the substrate that is to be coated. No special measures need be taken here; instead, the application may take place in accordance with the customary and known processes, which is another particular advantage of the slurry of the invention.

Following its application, the slurry of the invention dries without problems and does not film at the processing temperature, generally at room temperature. In other words, the slurry of the invention, applied as a wet film, loses water when flashed off at room temperature or slightly elevated temperatures, with the particles present therein changing their original form. As a result, the tendency toward mud-cracking is extremely low.

In the subsequent baking step, the now substantially water-free layer is caused to crosslink. In some cases it may be of advantage to carry out the leveling process and the crosslinking reaction with a chronological offset, by operating a staged heating program or a so-called heating ramp. The crosslinking temperature that is appropriate for the present examples is situated between 120 and 160° C. The corresponding baking time is between 20 and 60 minutes.

In the case of the dual-cure slurry of the invention, thermal curing is supplemented by curing with actinic radiation, which may be carried out using the customary and known radiation sources and processes, such as are described, for example, in the German patent application DE 198 18 735 A1, column 10, line 31 to column 11, line 22. These processes and equipment may also be used to cure the slurry of the invention that is curable with actinic radiation.

The resultant clearcoat has outstanding performance properties. For instance, it adheres firmly to all customary and known basecoats or to substrates such as metal, glass, wood, ceramic, stone, concrete or plastic. It is of high gloss, smooth, scratch-resistant, stable to weathering and chemicals, and even at high coat thicknesses is free from defects, such as stress cracks or popping marks. It no longer exhibits any blushing on exposure to moisture. Furthermore, it is free from microdefects and displays no disruptive optical effects, such as a starry sky that is similar to the metallic effect.

On the basis of this advantageous profile of properties, the slurry of the invention is outstandingly suitable for automotive OEM finishing, automotive refinish, the interior and exterior painting of buildings, the coating of doors, windows and furniture, and industrial coating, including coil coating, container coating, the coating of small parts, the impregnation and/or coating of electrical components, or the coating of white goods. It is used in particular to produce clearcoats as part of multicoat color and/or effect paint systems, which are produced from basecoat materials and the slurry of the invention by the customary and known wet-on-wet techniques.

For the wet-on-wet technique, the slurry of the invention may readily be combined with numerous basecoat materials, especially aqueous basecoat materials, without the occurrence of problems, such as cracking, lack of wettability, or poor intercoat adhesion.

The slurry of the invention may surprisingly also be used as an adhesive for producing adhesive films and as a sealing compound for producing seals, especially in the technical fields referred to above.

INVENTIVE AND COMPARATIVE EXAMPLES

Preparation Example 1

The Preparation of a Methacrylate Copolymer (Binder) for Inventive Use 39.75 parts by weight of methyl ethyl ketone were charged to a reaction vessel equipped with stirrer, reflux condenser, oil heating, nitrogen inlet pipe and two feed vessels, and this initial charge was heated to 78° C.

Thereafter, an initiator solution of 4 parts by weight of methyl ethyl ketone and 5 parts by weight of TBPEH was metered in at a uniform rate from the first feed vessel over the course of 6.75 h.

Fifteen minutes after the beginning of the initiator feed, a monomer mixture of 27.5 parts by weight of n-butyl methacrylate, 9.15 parts by weight of i-butyl methacrylate, 12.75 parts by weight of hydroxyethyl methacrylate and 0.6 part by weight of methacrylic acid was metered in at a uniform rate from the second feed vessel over the course of 6 h. The monomer line was then flushed with 0.25 part by weight of methyl ethyl ketone and the feed vessel with 0.5 part by weight of methyl ethyl ketone. After the end of the initiator feed, the feed vessel in question was likewise flushed with 0.5 part by weight of methyl ethyl ketone.

The reaction mixture was left to react at 78° C. for a further 3 h. The volatile fractions were then removed by vacuum distillation until the solids content was 70% by weight. The resin solution was then discharged. It had a viscosity of from 7.0 to 10.0 dPas (resin solids, 60 percent in xylene, at 23° C.). The acid number was from 9.0 to 11.0 and the hydroxyl number was 110 mg KOH/g resin solids.

Preparation Example 2

The Preparation of a Blocked Polyisocyanate Based on Hexamethylene Diisocyanate 534 parts by weight of Desmodur® N 3300 (commercial isocyanurate of hexamethylene diisocyanate from Bayer AG) and 200 parts by weight of methyl ethyl ketone were charged to a reaction vessel and this initial charge was heated to 40° C. 100 parts by weight of 2,5-dimethylpyrazole were added to the solution, with cooling, and the subsidence of the exothermic reaction was awaited. Thereafter, with continued cooling, a further 100 parts by weight of 2,5-dimethylpyrazole were added. After the exothermic reaction had again subsided, a further 66 parts by weight of 2,5-dimethyl-pyrazole were added. Cooling was then switched off, as a result of which the reaction mixture slowly warmed up to 80° C. It was held at this temperature until its isocyanate content had fallen to below 0.1%. The reaction mixture was then cooled and discharged.

The resulting solution of the blocked polyisocyanate had a solids content of 81% by weight (1 h at 130° C.) and a viscosity of 3.4 dPas (70% in methyl ethyl ketone; cone and plate viscometer at 23° C.).

Example 1

The Preparation of an Inventive Slurry and an Inventive Clear Coating 961.8 parts by weight of the methacrylate copolymer solution from preparation example 1 and 484.6 parts by weight of the solution of the blocked polyisocyanate from preparation example 2 were mixed with one another at room temperature in an open stirred vessel for 15 minutes. The resulting mixture was admixed with 21.5 parts by weight of Tinuvin® 400 and 10.7 parts by weight of Tinuvin® 123 (commercial light stabilizers from Ciba Specialty Chemicals, Inc.), after which the mixture was stirred at room temperature for 30 minutes. Then 1.15 parts by weight of dibutyltin dilaurate and 4.01 parts by weight of dimethylethanolamine were added. The resulting mixture was stirred at room temperature for a further two hours.

Subsequently, 735.7 parts by weight of deionized water in which 0.485 part by weight of ammonium acetate (corresponding to 6.3 mmol/1 000 g of water) had been dissolved were added in small portions to the mixture. After an interval of 15 minutes, a further 780 parts by weight of deionized water were added at a uniform rate over the course of 30 minutes.

The resulting aqueous emulsion was diluted with 739 parts by weight of deionized water. After that the same amount of a mixture of volatile organic solvents and water was removed from it under reduced pressure on a rotary evaporator, until the solids content was 37% by weight (1 h at 130° C.).

To set the desired pseudoplasticity, 90 parts by weight of Acrysol® RM-8W (commercial nonionic associative thickener from Rohm & Haas) and 15 parts by weight of Byk® 333 (commercial leveling agent from Byk Chemie) were stirred into the clearcoat slurry.

For application of the inventive slurry 1, a so-called integrated system with a black basecoat material was prepared.

For this purpose, steel panels coated cathodically with commercially customary electrocoat material were first of all coated with a functional coat (Ecoprime®; BASF Coatings AG) using a gravity-feed cup gun. After 5 minutes flashing off at room temperature, this film was overcoated in the same way with a black aqueous basecoat material (Ecostar®; BASF Coatings AG) and then subjected to initial drying at 80° C. for 5 minutes.

After the panels had cooled, the inventivie slurry 1 was applied in the same way. The panels were then flashed off initially for 5 minutes and subsequently subjected to initial drying at 40° C. for 15 minutes. They were then baked at 145° C. for 30 minutes.

The wet films applied were chosen so that, after baking, the dry film thicknesses for the functional coat and the aqueous basecoat were each 15 μm. The inventive clearcoat 1 had a film thickness of from 40 to 45 μm.

The inventive clearcoat 1 was hard, scratch-resistant, clear, bright, resistant to chemicals, weathering and condensation, and free from microdefects which bring forth an optical effect (starry sky) similar to the metallic effect.

Comparative Example C1

The Preparation of a Noninventive Clearcoat Slurry and Production of a Noninventive Clearcoat Example 1 was repeated, except that no ammonium acetate was added.

The resulting noninventive clearcoat was hard, scratch-resistant, clear, bright, and resistant to chemicals, weathering and condensation. However, it was not free from microdefects. These microdefects brought forth an optical effect (starry sky) similar to the metallic effect.

What is claimed is:

1. A pseudoplastic clearcoat slurry comprising
   an aqueous phase comprising water,
   particles that are dimensionally stable under storage and application conditions, and
   at least one water-soluble salt, optionally wherein the salt can be decomposed without residue, wherein the salt is present in an amount from 0.1 to 50 mmol per 1000 g of water.

2. The pseudoplastic clearcoat slurry of claim 1, wherein the salt is present in an amount from 0.5 to 8 mmol of salt per 1 000 g of water.

3. The pseudoplastic clearcoat slurry of claim 1, wherein the salt is decomposable under conditions of curing of the clearcoat slurry.

4. The pseudoplastic clearcoat slurry of claims 1, wherein the salt is decomposable thermally and/or with actinic radiation.

5. The pseudoplastic clearcoat slurry of claim 1, wherein the salt is thermally decomposable.

6. The pseudoplastic clearcoat slurry of claim 1, wherein decomposition products of the salt comprise at least one of a volatile elements, a neutral organic hydrogen compound, an inorganic hydrogen compound, an organic base, an inorganic base, an organic acid, an inorganic acid, and an oxides.

7. The pseudoplastic clearcoat slurry of claim 1, wherein the salt can be decomposed with the formation of decomposition products that have no toxicity and/or no corrosiveness.

8. The pseudoplastic clearcoat slurry of claim 1, wherein the decomposition products are at least one of water, nitrogen, carbon dioxide, ammonia, and an organic acid.

9. The pseudoplastic clearcoat slurry of claim 1, wherein the salt is an ammonium salts.

10. The pseudoplastic clearcoat slurry of claim 9, wherein the ammonium salt is selected from the group consisting of salts of ammonia with organic acids, salts of ammonia with inorganic acids, salts of organic amines with organic acids, salts of organic amines with inorganic acids, and combinations thereof.

11. The pseudoplastic clearcoat slurry of claim 9, wherein the ammonium salt is selected from the group consisting of ammonium carbonate, ammonium thiocyanate, ammonium sulfamate, ammonium sulfite monohydrate, ammonium formate, ammonium acetate, ammonium hydrogen oxalate monohydrate, diammonium oxalate monohydrate, ammonium citrate, and combinations thereof.

12. The pseudoplastic clearcoat slurry of claim 9, wherein the ammonium salt is selected from the group consisting of ammonium carbonated ammonium acetate, and combinations thereof.

13. The pseudoplastic clearcoat slurry of claim 1, wherein the particles have an average size of from 0.8 to 20 μm and at least 99% of the particles have a maximum size of 30 μm, as determined by the laser diffraction method.

14. The pseudoplastic clearcoat slurry of claim 1, wherein the slurry is curable thermally and/or with actinic radiation.

15. The pseudoplastic clearcoat slurry of claim 1, wherein the slurry has an organic solvents content of less than 3% by weight.

16. The pseudoplastic clearcoat slurry of claim 1, wherein the slurry is prepared by a process comprising
   1) emulsifying the particles in an organic solvent solution in water to give an emulsion of the oil-in-water type, wherein the salt is added to the water prior to or after the emulsification,
   2) removing the organic solvent, and
   3) replacing at least some of the volume of solvent removed with water.

17. The pseudoplastic clearcoat slurry as claimed in claim 16, wherein the salt is added to the water prior to the emulsification.

18. A method comprising applying the clearcoat slurry of claim 1 to a substrate as one of an automotive OEM finish, an automotive refinish, a building paint, a doors coating, a windows coating, a furniture coating, an industrial coating, a coil coating, a container coating, an electrical component impregnation, an electrical components coating, a white goods coating, an adhesive, or a sealing compound.

19. The method of claim 18, wherein the clearcoat slurry is applied to the substrate to produce at least one clearcoats as a part of a multicoat color and/or effect paint systems.

* * * * *